United States Patent Office 3,532,794
Patented Oct. 6, 1970

3,532,794
TREATMENT OF PEPTIC ULCERS WITH COMBINATIONS OF BROMPHENIRAMINE AND GLYCOPYRROLATE
Reevis S. Alphin, Richmond, Va., assignor to A. H. Robins Incorporated, Richmond, Va., a corporation of Virginia
No Drawing. Filed Feb. 28, 1968, Ser. No. 708,763
Int. Cl. A61k 27/00
U.S. Cl. 424—263                                      5 Claims

ABSTRACT OF THE DISCLOSURE

Combining brompheniramine with glycopyrrolate, each in oral dosage form, results in an effective medication for the prevention of recurrent peptic ulcer and for the treatment of ulcerated conditions.

---

The principal object of the present invention is to provide a novel treatment and combination containing brompheniramine and glycopyrrolate, each in oral dosage form. Use of this combination results in a more effective medication for the treatment of peptic ulcer and for the prevention of recurring peptic ulcers.

It is generally agreed that peptic ulcer constitutes a disease entity both in regard to the localization and also in a chronological sense. By definition, a chronic peptic ulcer occurs only in those areas subjected to the digestive power of the gastric juice. Most of the investigations concerned with the pathogenesis of peptic ulcer suggest that the course of the disease cannot be explained on the basis of a single universal causative factor, but rather indicate the necessity for a consideration of the existence of multiple causative factors. These factors, vascular disturbances, mechanical trauma, gastritis, acid-pepsin digestive activity, loss of mucosal defense and reparative processes, epithelial necrosis and psychosomatic disorders, may be involved in ulceration.

It has been known for a long time that certain drugs, i.e., anticholinergics, are effective in reducing the amount of hydrochloric acid produced by the stomach. The reduction in hydrochloric acid is considered to be necessary in order to protect the gastric mucosa from the corrosive action of the acid and thereby reducing the chances for the existence of an environment favorable for the development of an ulcerative condition. Furthermore, if the mucosal environment is maintained at near neutral pH values, the digestive action of the pepsin is markedly reduced or abolished. Such an environment within the stomach is highly desirable, particularly from the standpoint of the combined action of acid-pepsin on existing ulceration.

Since the pathogensis of peptic ulceration is not known, but most likely involves many contributing factors of which acid and pepsin represent only two, the novel combination of this invention has been found to be particularly effective, probably due to its ability to aid in maintaining and/or increasing the muscosal resistance to changes leading to ulceration. Although it is difficult to identify specific factors as distinct ulcerogenic processes, nevertheless, it seems logical to consider changes in the micro-capillary circulation of the gastric mucosa as one possible initiating step in ulcerogenesis. Endogenously released histamine may be considered to cause such alterations in the gastric microcirculation. Such changes, while not necessarily representing the natural cause of peptic ulcer, can be induced by the parenteral administration of histamine in animals.

Thus one specific advantage of this invention is the control of, or protection against, the circulatory effects of histamine by an antihistamine, even though inclusion of the latter is contrary to presently known and practised methods of treatment which are narrowly directed to inhibition of gastric secretion and protection against the action of gastric acid. It is well known that histamine induces gastric acid secretion and that an antihistamine will not inhibit the gastric secretory response to histamine. Therefore the antihistamine, brompheniramine, as employed in this invention is for the purpose of cooperating with glycopyrrolate rather than to add to the antisecretory action of the latter.

EXPERIMENTAL (a) Alterations in the microcapillary circulation of the gastric mucosa of guinea pigs were induced by histamine. The gastric ulceration and/or lesions were induced by a single intraperitoneal injection of histamine dihydrochloride (4 mg./kg.). Treated animals received various doses of the test compounds by subcutaneous injection 45 minutes prior to and 120 minutes following the injection of histamine. Six hours following the histamine injection, the animals were sacrificed by a sharp blow on the head. The stomach was removed, washed and examined macroscopically to determine the incidence and severity of the ulcerations and/or lesions.

(b) Gastric ulceration in animals occurring as the result of acute stress has been used as another means for the study of the mechanisms of ulceration. Guinea pigs, under light ether anesthesia, were individually wrapped in a plaster of Paris bandage so as to be completely immobilized. The test compounds were injected subcutaneously every six hours during the restraint period (24 hours). At the end of the restraint period, the animals were sacrificed and the stomachs removed. The stomachs were washed and examined macroscopically for ulceration.

(c) The mechanism for gastric ulceration produced by reserpine is unknown; however, it represents another type of experimental ulcer. Although the site of action is unknown, investigations point to the possibility of an effect at the secreting cell itself, the parasymphathetic ganglia and postganglionic nerve endings. There is also the fact that reserpine liberates histamine, catecholamines and serotonin from their tissue depots and that these substances may act as stimulants of gastric secretion. Thirty minutes prior to reserpine (serpasil, Ciba, 5.0 mg./kg., I.M.), the rats were injected subcutaneously with the test compounds. Ten hours following reserpine, the rats were again injected with the test compounds. At 20 hours post reserpine, the rats were sacrificed with chloroform. Stomachs were removed and examined macroscopically for ulceration.

(d) The pyloric-ligated rat represents another experimental method which has afforded an opportunity to further assess factors involved in gastric ulceration. It can be shown that the pathogenesis of the ulcer produced by pyloric-ligation is caused by the accumulation of acid-pepsin in the stomach. Under light ether anesthesia, a ligature was placed around the pylorus of rats via a midline incision. Test compounds were administered subcutaneously and/or orally at various time intervals following ligation. Sixteen hours post-ligation, the rats were sacrificed with chloroform. The stomachs were removed and examined for ulceration.

RESULTS

The effects of brompheniramine or glycopyrrolate on histamine, histamine+pyloric-ligated and restraint-induced ulceration in guinea pigs are shown in Table 1. The data show that brompheniramine (5.0 mg./kg., S.C., 2×) exerted a marked protective effect on histamine-induced ulceration. The incidence of ulceration in the control group was 63% while it was only 2% in the brompheniramine-treated group. Glycopyrrolate (2.5 mg./kg., S.C., 2×), a potent anticholinergic, failed to provide any protective action in these experiments.

The results in the restraint-induced ulceration show that glycopyrrolate (5.0 mg./kg., S.C., 4×) provided a marked protective effect, the percent ulceration being only 20 as compared with control values of 80%. The brompheniramine treated group (5.0 mg./kg., S.C., 4×) showed no difference from the control group either in regard to incidence or severity of ulceration.

The effect of brompheniramine and/or glycopyrrolate on histamine-induced ulceration in guinea pigs is shown in Table 2. Even though the effect of the combination was not significantly different, there was some indication that a combination was more effective than either drug alone.

Table 3 shows the effect of brompheniramine and/or glycopyrrolate on histamine+pyloric-ligation in guinea pigs. Here again, the combination of the two drugs appeared to be somewhat more effective than either drug alone.

Table 4 depicts the results obtained with brompheniramine and/or glycopyrrolate on reserpine-induced ulceration in rats. Glycopyrrolate in the highest dose used (5.0 mg./kg., S.C., 2×) provided a significant protective effect as shown in Experiment 1. Brompheniramine (5.0 mg./kg., S.C., 2×) did not provide any protective action. The combination of the two drugs appeared to provide a somewhat greater protective effect than did glycopyrrolate alone.

TABLE 1.—EFFECT OF BROMPHENIRAMINE AND GLYCOPYRROLATE ON GASTRIC ULCERATION IN GUINEA PIGS

| | Dose, mg./kg. s.c. | No. injections, test cpds.[a] | No. animals with ulcers no. treated | Percent ulceration | Ulcer index average [b] |
|---|---|---|---|---|---|
| Histamine ulceration: | | | | | |
| Control | | | 51/71 | 63.0 | 27.0 |
| Brompheniramine | 5.0 | 2 | 1/55 | 2.0 | 10.0 |
| Glycopyrrolate | 2.5 | 2 | 17/27 | 71.0 | 30.0 |
| Histamine plus pyloric-ligated ulceration: | | | | | |
| Control | | | 14/19 | 73.0 | 60.0 |
| Brompheniramine | 10.0 | 4 | 1/7 | 14.0 | 24.0 |
| Glycopyrrolate | 2.5 | 4 | 2/5 | 40.0 | 44.0 |
| Restraint ulceration: | | | | | |
| Control | | | 16/20 | 80.0 | 26.8 |
| Brompheniramine | 5.0 | 4 | 4/5 | 80.0 | 26.0 |
| Glycopyrrolate | 5.0 | 4 | 1/5 | 20.0 | 16.0 |

[a] Injections during experiment.
[b] Ulcer index grading system:
Score 0—Normal stomach,
Score 10—Petechial emorrhage.
Score 20—Definitei hemorrhagic areas.
Score 30—One or two small ulcers.
Score 40—Extensive ulceration.
Score 100—Perforated ulcer.

TABLE 2.—EFFECT OF BROMPHENIRAMINE AND/OR GLYCOPYRROLATE ON HISTAMINE-INDUCED ULCERATION IN GUINEA PIGS

| | Dose, mg./kg. s.c. | No. injections, test cpds. | No. animals with ulcers no. treated | Percent ulceration | Ulcer index average [a] |
|---|---|---|---|---|---|
| Controls | | | 5/7 | 71.0 | 34.2 |
| Brompheniramine | 0.25 | 2 | 1/9 | 11.0 | 8.8 |
| Glycopyrrolate | 1.0 | 2 | 4/8 | 50.0 | 25.7 |
| Combination | (b) | 2 | 1/10 | 10.0 | 5.0 |

[a] Ulcer index grading system:
Score 0—Normal stomach.
Score 10—Petechial hemorrhage.
Score 20—Definite hemorrhagic areas
Score 30—One or two small ulcers.
Score 40—Extensive ulceration.
[b] Above doses.

TABLE 3.—EFFECT OF BROMPHENIRAMINE AND/OR GLYCOPYRROLATE ON HISTAMINE PLUS PYLORIC-LIGATED INDUCED ULCERATION IN GUINEA PIGS

| | Dose, mg./kg. s.c. | No. injections, test cpds. | No. animals with ulcers no. treated | Percent ulceration | Ulcer index average [a] |
|---|---|---|---|---|---|
| Controls | | | 4/5 | 80.0 | 55.0 |
| Brompheniramine | 10.0 | 4 | 1/7 | 14.0 | 24.0 |
| Glycopyrrolate | 2.5 | 4 | 2/5 | 40.0 | 44.0 |
| Combination | (b) | 4 | 0/7 | 0.0 | 10.0 |

[a] Ulcer index grading system:
Score 0—Normal stomach.
Score 10—Petechial hemorrhages.
Score 20—Definite hemorrhagic areas.
Score 30—One or two small ulcers.
Score 40—Extensive ulceration;
Score 100—Perforated ulcers.
[b] Above doses.

TABLE 4.—EFFECT OF BROMPHENIRAMINE AND GLYCOPYRROLATE ON RESERPINE-INDUCED ULCERATION IN RATS

|  | Dose, mg./kg. s.c. | No. injections | No. animals with ulcers no. treated | Percent ulceration | Ulcer index average [a] |
| --- | --- | --- | --- | --- | --- |
| Experiment 1: |  |  |  |  |  |
| Control | | | 5/5 | 100.0 | 3.0 |
| Brompheniramine | 5.0 | 2 | 5/5 | 100.0 | 2.2 |
| Glycopyrrolate | 5.0 | 2 | 1/5 | 20.0 | 1.0 |
| Combination | ([b]) | 2 | 0/5 | 0.0 | 0.8 |
| Experiment 2: |  |  |  |  |  |
| Control | | | 5/5 | 100.0 | 2.2 |
| Brompheniramine | 5.0 | 2 | 5/5 | 100.0 | 2.4 |
| Glycopyrrolate | 0.5 | 2 | 2/5 | 40.0 | 1.4 |
| Combination | ([b]) | 2 | 1/5 | 20.0 | 1.1 |

[a] Ulcer index grading system:
 Score 0—Normal stomach.
 Score 0.5—Gray discoloration.
 Score 1.0—Petechial hemorrhage.
 Score 2.0—One or two small ulcers.
 Score 3.0—Many ulcers.
[b] Above doses.

Glycopyrrolate is 1 - methyl - 3 - pyrrolidyl-α-phenylcyclopentaneglycolate, an anti-cholinergic drug, the efficacy of which is well documented. It is prepared in oral dosage form, e.g., tablets, according to standard procedures known to the art-skilled. Beyond the limitation that the acid addition salt of the free base of glycopyrrolate be pharmaceutically acceptable, the acid addition is unlimited and does not have a material influence on the activity of the glycopyrrolate relied upon. Suitable acids of addition are well known and are not, per se, of the essence to the subject invention.

Brompheniramine is 1-(p-bromphenyl)-1-(2 - pyridyl)-3-dimethylaminopropane, an antihistaminic which is available in tablet or liquid form and is easily absorbed from the intestine. It is likewise prepared in oral dosage form, e.g., tablets, according to standard procedures known to the art-skilled. For the purpose of this invention, the brompheniramine is employed in the form of a pharmaceutically acceptable acid edition salt thereof, e.g., brompheniramine maleate. Beyond the limitation that the acid addition salt be pharmaceutically acceptable, the acid of addition is unlimited an does not have a material influence on the activity of the brompheniramine relied upon.

The weight ratio of glycopyrrolate to brompheniramine may vary from 1–1 to 1–10, or preferably 1–5. The preferred average daily dosage of glycopyrrolate is from 3 milligrams to 12 milligrams administered orally in equal divided doses from two to four times a day. The average daily dosage of brompheniramine is from 6 milligrams to 60 milligrams administered orally in equal divided doses from two to four times a day.

As mentioned above, histamine release produced conditions favorable to the formation of peptic ulcer, e.g., by stimulating the secretion of gastric juice rich in hydrochloric acid. Neurogenic gastric hyperchlorhydria is further attributed to the increase of acetylcholine release. Unfortunately, neither the natural production of histamine nor the enhanced secretory activity of gastric glands in response to histamine is blocked by antihistaminic drugs. In peptic ulcer patients, antihistaminic drugs fail to reduce spontaneous gastric glands to histamine. Notwithstanding this, the brompheniramine appears to produce a cooperative effect with that produced by glycopyrrolate by blocking the effects of the histamine on gastric microcirculation, a condition not heretofore treated in humans in conjunction with gastric antisecretory drugs, such as glycopyrrolate.

In order to exemplify the subject invention, clinical test results are presented. The procedures, dosages, dosage forms, administration, etc., are merely illustrative, but clearly enable the art-skilled to practice this invention.

Peptic ulcer disease in Nigeria is of the same pattern as in Europe or in the United States. The only distinction is in age distribution and sex incidence. The data presented were obtained from an open trial conducted at a duodenal ulcer clinic run at the University College Hospital in Ibadan, Nigeria, a city having a population of one million people.

In a double blind trial conducted in Ibadan in 1965, the recurrence rate after nine months of therapy was 28 percent.

In the present study 93 of the 124 patients who started completed the trial. Although the duration of the trial varied from 17 to 19 months, the majority of patients were studied for 18 months.

A complete physical examination was given to each patient at his first visit to the clinic. Those with several bleeds were excluded from the trial. There was no age limit. A chest X-ray was taken of each patient, and all but a pregnant female patient were subjected to a barium meal examination.

Patients included in the trial were classified as shown in Table I.

TABLE I

| Category [1] | Findings | Signs and Symptoms |
| --- | --- | --- |
| I | Clinical signs and symptoms of duodenal ulcer but no ulcer crater after barium meal. | Epigastric pain, right or left hypochondrial pain, periodicity of symptoms, nocturnal pain, pain relieved by alkali, backache. |
| II | Clinical signs and symptoms of duodenal ulcer with ulcer crater after barium meal. | Any of the signs and symptoms in Category I, plus ulcer crater or duodenal deformity after barium meal. |

[1] Included in the trial.

The common symptoms are epigastric pain or discomfort, abdominal discomfort, nausea and vomiting or backache. The common signs are tenderness in epigastrium, right or left hypochondria, or tenderness around the umbilicus.

Ancillary investigations included haemoglobin estimation, packed cell volume, mean-corpuscular haemoglobin, white cell count and examination of peripheral blood film. Other investigations included stool examination for occult blood and count of hookworm ova and other worms which may give rise to symptoms given in Category I. Patients with a heavy load of hookworm ova were excluded from the trial. Patients were not allowed to take salicylates, steroids or antacids during the investigation period. Patients were allowed to carry on their normal daily work but were advised either to stop smoking completely or to reduce their daily use of tobacco.

For the purpose of this trial the drugs employed were glycopyrronium bromide (glycopyrrolate) [2 milligram tablets] and brompheniramine [10 milligram tablets]. (The stated number of milligrams is the weight of the indicated active component in each tablet.)

Each patient was seen fortnightly for clinical assessment and given a two-week supply of drugs. The dosage for the drugs was one tablet of each drug taken twice daily. The morning dose was taken before breakfast; the evening dose, the last thing at night. In some cases, dosage was altered to three times per day in order to control symptoms. As soon as the symptoms subsided, the dosage was reduced to twice daily. Patients who defaulted for more than one month were automatically removed from the trial.

Each patient was carefully interrogated and examined during each visit to the clinic. The effects of the medical regimen on the recurrence rate of duodenal ulcer are summarized in Tables II and III. Of the 124 patients who entered the trial, 30 defaulted. Of the 94 remaining, one was found to have carcinoma of the stomach and was removed from the trial for this reason. Of the 93 who completed the trial, 75 patients (80.6%) were completely free from signs and symptoms of duodenal ulcer at the end of the trial; 13 patients (13.9%) had evidence of recurrence after an initial response to medical management; and 5 patients (5.4%) did not improve. The average age of the patients was 37 years, the youngest being 14 and the oldest 67. There were 57 males and 37 females, a ratio of 3:2.

The incidence of side effects is shown in Table IV. The commonest side effect was dry mouth or pharynx. Only two patients actually complained of difficulty in swallowing. The next commonest side effect was blurring or vision, occurring in six patients (8%). Constipation was relieved by vegetable laxatives. There was no patient with difficulty in micturition.

TABLE II.—RESPONSE OF PATIENTS TO THERAPY
[Total Number of Patients: 93]

| | Number | Percent |
|---|---|---|
| Complete improvement at the end of 18 months | 75 | 80.6 |
| Patients with evidence of recurrence at the end of 18 months | 13 | 14 |

TABLE III.—RESPONSE OF PATIENTS TO THERAPY
[Number of Patients: 93]

| | Number | Percent |
|---|---|---|
| Patients with either complete or partial improvement during trial | 88 | 94.6 |
| Patients with no clinical improvement at any stage | 5 | 5.4 |

TABLE IV.—INCIDENCE OF SIDE EFFECTS [1]

| Side effects | Test compounds glycopyrrolate and brompheniramine | |
|---|---|---|
| | Number | Percent |
| Dry mouth and pharynx | 35 | 46.6 |
| Blurring of vision | 6 | 8 |
| Constipation | 4 | 5.3 |
| Difficulty in micturition | 0 | 0 |

[1] Among 75 patients who responded completely to treatment.

The results show that brompheniramine maleate plays an important role in the prevention of the recurrence of duodenal ulceration when administered in conjunction with glycopyrrolate.

I claim:
1. A method for the treatment of peptic ulcer which comprises administering orally to a human being suffering therefrom a composition comprising effective amounts of glycopyrrolate and brompheniramine wherein the weight ratio of glycopyrrolate to brompheniramine is from 1 to 1 and 1 to 10.

2. A process according to claim 1, wherein the weight proportion of glycopyrrolate to brompheniramine is from 1 to 1 and 1 to 10, and the dosage of the combination of glycopyrrolate and brompheniramine is sufficient to reduce the symptoms and/or chance of recurrence of duodenal ulceration.

3. A process according to claim 2, wherein the weight ratio of glycopyrrolate to brompheniramine is 1 to 5.

4. A process according to claim 1 wherein the glycopyrrolate is in the form of glycopyrronium bromide.

5. A process according to claim 1 wherein the brompheniramine is in the form of brompheniramine maleate.

References Cited

Prescribing Bulletin for Robinol, A. H. Robins (1964).
Prescribing Bulletin for Dimetaine, A. H. Robins (1963).

STANLEY J. FRIEDMAN, Primary Examiner

U.S. Cl. X.R.

424—274